United States Patent
Scheja et al.

(10) Patent No.: US 10,760,805 B2
(45) Date of Patent: Sep. 1, 2020

(54) AIR PURIFIER

(71) Applicant: KONINKLIJKE PHILIPS N.V., Eindhoven (NL)

(72) Inventors: Michael Martin Scheja, Eindhoven (NL); Declan Patrick Kelly, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 107 days.

(21) Appl. No.: 16/304,489

(22) PCT Filed: May 26, 2017

(86) PCT No.: PCT/EP2017/062753
§ 371 (c)(1),
(2) Date: Nov. 26, 2018

(87) PCT Pub. No.: WO2017/203031
PCT Pub. Date: Nov. 30, 2017

(65) Prior Publication Data
US 2019/0301761 A1 Oct. 3, 2019

(30) Foreign Application Priority Data

May 27, 2016 (CN) ................. PCT/CN2016/083626
Aug. 30, 2016 (EP) .................................... 16186220

(51) Int. Cl.
*F24F 11/39* (2018.01)
*F24F 3/16* (2006.01)
(Continued)

(52) U.S. Cl.
CPC ............ *F24F 11/30* (2018.01); *F24F 3/1603* (2013.01); *F24F 11/39* (2018.01); *F24F 2110/50* (2018.01); *F24F 2110/64* (2018.01)

(58) Field of Classification Search
CPC ...... F24F 11/30; F24F 3/1603; F24F 2110/64; F24F 11/39; F24F 2110/50
See application file for complete search history.

(56) References Cited

U.S. PATENT DOCUMENTS 5,564,626 A * 10/1996 Kettler .................... F24F 3/044
236/49.3
5,590,830 A * 1/1997 Kettler .................... F24F 3/044
236/49.3
(Continued)

FOREIGN PATENT DOCUMENTS

CN 102019102 A 4/2011
EP 0864348 A1 9/1998
(Continued)

OTHER PUBLICATIONS http://www.aaaai.org/global/nab-pollen-counts/reading-the-charts.aspx.

*Primary Examiner* — Charles R Kasenge

(57) ABSTRACT

An air purification apparatus (100) is disclosed that comprises a flow channel (110) extending between an inlet (111) and an outlet (113); a pollutant removal structure (120) and an air displacement apparatus (130) in the flow channel; a branched sensor channel (140) including: a first branch (142) extending between an ambient air port (141) and a further outlet (143) in the flow channel between the inlet and the air displacement apparatus; and a second branch (144) extending between the ambient air port and a further inlet (145) in the flow channel between the air displacement apparatus and the outlet, the first branch and second branch sharing a branch section; at least one sensor (150) in the shared branch section; a valve arrangement (161, 163) in the branched sensor channel adapted to exclusively disconnect the first branch from the flow channel in a first configuration and exclusively disconnect the second branch from the flow (Continued)

channel in a second configuration; and a controller (170) adapted to control the valve arrangement.

9 Claims, 6 Drawing Sheets

(51) Int. Cl.
   *F24F 11/30* (2018.01)
   *F24F 110/50* (2018.01)
   *F24F 110/64* (2018.01)

(56) References Cited

U.S. PATENT DOCUMENTS

| | | | | |
|---|---|---|---|---|
| 5,707,005 A | * | 1/1998 | Kettler | F24F 3/044 236/49.3 |
| 6,872,237 B2 | * | 3/2005 | Gillingham | B01D 46/0005 55/302 |
| 7,090,711 B2 | * | 8/2006 | Gillingham | B01D 46/0005 55/481 |
| 2003/0181158 A1 | | 9/2003 | Schell | |
| 2009/0136388 A1 | * | 5/2009 | Chan | B01D 53/8668 422/115 |
| 2012/0070336 A1 | * | 3/2012 | Chan | F24F 3/1603 422/4 |
| 2012/0145010 A1 | | 6/2012 | Yamamoto | |
| 2012/0230876 A1 | * | 9/2012 | Chan | F24F 13/28 422/111 |

FOREIGN PATENT DOCUMENTS

| | | |
|---|---|---|
| JP | 50115732 | 9/1975 |
| JP | 8033822 | 2/1996 |
| JP | 11156132 | 6/1999 |
| KR | 20060099125 A | 9/2006 |
| KR | 20100130938 A | 12/2010 |
| WO | 2012066453 A1 | 5/2012 |

* cited by examiner ns are hereby incorporated by reference herein.

AIR PURIFIER

This application is the U.S. National Phase application under 35 U.S.C. § 371 of International Application No. PCT/EP2017/062753, filed on May 26, 2017, which claims the benefit of International Application No. PCT/CN2016/083626 filed on May 27, 2016 and International Application No. 16186220.6 filed on Aug. 30, 2016. These applications are hereby incorporated by reference herein.

FIELD OF THE INVENTION

The present invention relates to an air purification apparatus comprising a flow channel extending between an inlet and an outlet and a pollutant removal structure and air displacement apparatus in the flow channel.

BACKGROUND OF THE INVENTION

Air purifiers are commonplace in today's society to clean air in confined spaces, e.g. rooms, for example to reduce the exposure of people in such confined spaces to harmful or unpleasant pollutants, e.g. allergens, particles, odours, and so on. To this end, the air purifiers typically comprise one or more pollutant removal structures, such as one or more filters, catalytic converters, electrostatic precipitators, and so on. The one or more filters may include air filters such as carbon filters, HEPA filters, odour filters, anti-bacterial filters or the like. Catalytic converters may be used to break down gaseous pollutants into smaller molecules, e.g. $H_2O$ and $CO_2$. Electrostatic precipitators may be employed for the removal of charged particles via collector plates. Other pollutant removal technologies employed in such purifiers are also known.

In order to control the operation of the air purifier, the air purifier may contain pollutant sensors, e.g. to regulate the air flow through the air purifier based on measured pollutant concentrations in the inbound air or to monitor the performance of the pollutant removal structures, which typically have a limited lifespan and must therefore be regularly replaced or serviced in order to ensure that the air purifier exhibits the desired performance characteristics, i.e. sufficiently purifies the air in a confined space in which the air purifier is placed, e.g. a room of a building such as an office space or a house.

A commonly used figure of merit for air purifiers is the clean air delivery rate (CADR), which expresses the fraction of pollutants that have been removed from the air times the CFM (cubic feet per minute) air flow rate through the air purifier.

However, it is not straightforward to predict when such pollutant removal structures need replacing or maintenance. Given that such pollutant removal structures, e.g. air filters, can be rather costly, it is desirable that such pollutant removal structures are not prematurely replaced or serviced as this can significantly increase the operating cost of an air purifier. On the other hand, if pollutant removal structure replacement or servicing is delayed beyond its end of life (EOL), the performance of the air purifier including the pollutant removal structure may become insufficient, which may lead to health problems for people occupying the confined space in which the air purifier is positioned. This is particularly prevalent for certain risk groups; it is well documented that pregnant women, infants/children, elderly and people with respiratory or cardiovascular disease are at increased risk from pollution exposure. For these groups, there is an enhanced need to minimize their exposure to air pollution.

Several air purifier manufacturers maintain fixed EOL values for the pollutant removal structures in the air purifier such that a user is prompted at regular intervals to replace or service such structures. However, this approximation does not factor in environmental conditions and operating times and may therefore lead to rather inaccurate approximations of the EOL of these pollutant removal structures.

According to GB/T 18801 standard, the lifetime of an air filter is reached once its initial CADR falls to 50%. The decrease in CADR, which for instance is caused by ageing of the air filter, correlates with an increase in the time required to reduce the room concentration of a pollutant. One of the attractions of such a standard is that it enables consumers to compare the standardized performance of different air purifiers such that an air purifier best matching a consumer's need can be more easily identified.

However, this standard is still based on generalized assumptions, e.g. 12 hours per day running time, fixed air exchange rates etc., without taking into account the actual usage of the air purifier. Since the actual life time depends on multiple factors related to the actual usage as introduced above, the problem arises that most of the users, when following the manufacturer's recommendations, will replace or service their pollutant removal structure either too early, which causes unnecessary costs or too late, which means that the pollutant removal structure is still used even when it is no longer able to reduce a pollutant level to a safe value.

CN 102019102 A discloses a method for real-time monitoring of the pollution level of a filter layer of an air purification machine, comprising a detection method of air quality. The method is characterized in that air quality sensors are arranged at the air inlet end and the air outlet end of the filter layer and used for detecting the air quality at the two sides of the filter layer; and an operation circuit judges the pollution level of the filter layer according to air quality signals detected by the two air quality sensors. When the filter layer is severely polluted so that the purification effect is poor, an alarm signal can be sent out to remind a user of timely changing or washing the filter layer, thereby ensuring the use effect of the air purification machine. The need to integrate multiple air quality sensors into the air purification machine increases its cost, which may be undesirable. Moreover, the use of multiple air quality sensors may complicate the accurate determination of the filter layer EOL, for example because the respective air quality sensors exhibit a different drift in sensitivity over time, e.g. because the air quality sensor in front of the filter layer becomes more contaminated with pollutants than the air quality sensor behind the filter layer.

US 2003/181158 A1 discloses an economizer control, which includes a sensor that senses characteristics of air, a damper located relative to the sensor so that the damper can control air flow of outside air and re-circulated air to the sensor, and a controller in communication with the sensor and the damper. The controller controls the opening and closing of the damper according to conditions sensed by the sensor.

US 2012/145010 A1 discloses an air cleaner, a case of an air cleaner includes an inlet, through which the outside air is taken in by rotation of an internal fan. The outside air taken in passes through a filter from the inlet in a first flow path. A sensor unit is arranged outside of the first flow path, and the outside air taken in passes through the sensor unit from the inlet by a flow path pipe forming a second flow path different from the first flow path. As a result, the outside air taken in through the flow path different from the flow path toward the filter is sensed by the sensor unit.

SUMMARY OF THE INVENTION

The present invention seeks to provide an air purification apparatus that can determine the concentration of an analyte of interest in multiple fluid streams in a cost-effective manner.

According to an aspect, there is provided an air purification apparatus comprising a flow channel extending between an inlet and an outlet; a pollutant removal structure and an air displacement apparatus in the flow channel; a branched sensor channel including a first branch extending between an ambient air port and a further outlet in the flow channel between the inlet and the air displacement apparatus; and a second branch extending between the ambient air port and a further inlet in the flow channel between the air displacement apparatus and the outlet, the first branch and second branch sharing a branch section; at least one sensor in the shared branch section; a valve arrangement in the branched sensor channel adapted to exclusively disconnect the first branch from the flow channel in a first configuration and exclusively disconnect the second branch from the flow channel in a second configuration; and a controller adapted to control the valve arrangement.

The branched sensor channel housing a sensor such as a pressure sensor or a pollutant sensor that can be configurably fluidly connected to ambient air getting sucked into the main flow channel of the air purification apparatus through the branched sensor channel in a first configuration and to purified air getting forced out of the air purification apparatus through the branched sensor channel in a second configuration provides an air purification apparatus that can accurately determine pollutant levels in the ambient air as well as determine purification efficiency of the air purification apparatus using a single sensor only, thereby providing a cost-effective air purification apparatus that is insensitive to accuracy issues caused by uncorrelated drift characteristics of sensors before and after the air displacement apparatus and/or one or more pollutant removal structures of the air purification apparatus. In addition, in operation, the air displacement apparatus may create an underpressure relative to ambient pressure in a section of the flow channel upstream from the air displacement apparatus whilst at the same time creating an overpressure relative to ambient pressure in a further section of the flow channel downstream from the air displacement apparatus. The first branch is typically connected to the underpressure and the second branch is typically connected to the overpressure, such that air is forced through the respective channels towards the sensor device. In this manner, high air flow velocities can be achieved through the respective branches by appropriate dimensioning of these branches, which has the advantage that low concentrations of a pollutant of interest in these air flows can be effectively detected with the sensor in case of the sensor comprising a pollutant sensor.

The air purification apparatus may be adapted to transfer the sensor readings of the at least one pollutant sensor to a remote processing device. Alternatively, the at least one sensor may comprise a pollutant sensor, and the air purification apparatus may further comprise a processor communicatively coupled to the pollutant sensor, the processor being adapted to derive a pollutant concentration from sensor data provided by the pollutant sensor to facilitate pollutant concentration monitoring by the air purification apparatus. The controller and the processor may be separate devices or alternatively the controller may comprise the processor, e.g. the processor may also control the valve arrangement.

In an embodiment, wherein the controller is adapted to periodically switch the valve arrangement between the first configuration and the second configuration; and the processor is adapted to derive a first pollutant concentration from sensor data provided by the pollutant sensor with the valve arrangement in the first configuration; derive a second pollutant concentration from sensor data provided by the pollutant sensor with the valve arrangement in the second configuration; and determine a pollutant removal efficiency of the pollutant removal structure from the derived first pollutant concentration and second pollutant concentration. This may facilitate an optimal operation of the air purification apparatus.

For example, the processor may be further adapted to compare the determined pollutant removal efficiency against a defined efficiency threshold and to generate a pollutant removal structure end of life signal if the determined pollutant removal efficiency is below the defined efficiency threshold, thereby facilitating the timely replacement or servicing of the pollutant removal structure responsible for the removal of the pollutant monitored by pollutant sensor.

The air purification apparatus may further comprising a sensory output device responsive to the pollutant removal structure end of life signal, e.g. a display, a LED arrangement and/or a loudspeaker or the like to generate a visual or audible warning indicative of the end of life (or estimated remaining lifetime) of the pollutant removal structure.

Alternatively or additionally, the air purification apparatus may further comprise a data communication module configurable to connect to a remote pollutant removal structure service and to order a replacement or service of the pollutant removal structure with the remote pollutant removal structure service in response to the pollutant removal structure end of life signal. This has the advantage that the likelihood of the pollutant removal structure being timely replaced or serviced is increased due to the automated nature of the ordering of the replacement or servicing.

The processor may be adapted to provide the air displacement apparatus with an air displacement apparatus control signal generated in response to the derived pollutant concentration. In this manner, the air flow through the air purification apparatus may be regulated as a function of the derived pollutant concentration, e.g. to ensure that a pollutant is efficiently, i.e. quickly, removed from the ambient air.

The air displacement apparatus may be positioned in between the pollutant removal structure and the outlet for efficient operation of the air purification apparatus.

The at least one sensor may be any suitable sensor. For example, the at least one sensor may be a pressure sensor or may be a pollutant sensor comprising at least one of a pollen sensor, a particle sensor and an odour sensor.

In an embodiment, the valve arrangement comprises a first valve in the first branch between the shared branch section and the further outlet and a second valve in the second branch between the shared branch section and the further inlet to facilitate configuration of the branched sensor channel in a straightforward manner. The first valve and second valve may be implemented in any suitable manner. For example, the first valve and the second valve may be solenoid valves.

In a particularly preferred embodiment, the air purification apparatus is operable to create an underpressure relative to ambient pressure in a section of the flow channel upstream from the air displacement apparatus and an overpressure relative to ambient pressure in a further section of the flow channel downstream from the air displacement apparatus, wherein the further inlet is in fluid communication with the section characterized by said underpressure and the further outlet is in fluid communication with the further section characterized by said overpressure during operation of the air purification apparatus. This has the advantage that the desired air flows through the branched sensor channel may be achieved without additional air displacement apparatuses.

According to another aspect, there is provided a method of operating the air purification apparatus according to any of the embodiments of the present invention, the method comprising configuring the valve arrangement into the first configuration; determining a first pollutant concentration or a first pressure with the at least one sensor with the valve arrangement in the first configuration; configuring the valve arrangement into the second configuration; determining a second pollutant concentration or a second pressure with the at least one sensor with the valve arrangement in the second configuration; and calculating a pollutant removal efficiency for the pollutant removal structure from the determined first pollutant concentration and the determined second pollutant concentration or from the determined first pressure and second pressure. This facilitates the determination of the pollutant removal efficiency using a single pollutant sensor only, which for example improves the accuracy of the pollutant removal efficiency determination.

The method may further comprise estimating an end of life for the pollutant removal structure by comparing the calculated pollutant removal efficiency against a defined efficiency threshold. In this manner, a replacement or service for the pollutant removal structure may be timely arranged, thereby reducing the risk of sub-standard performance of the air purification apparatus. To this end, the method may further comprise generating a pollutant removal structure end of life signal if the determined pollutant removal efficiency is below the defined efficiency threshold, which signal may be used to generate a sensory output with a sensory output device or automatically ordering a service or replacement of the pollutant removal structure, e.g. over a network such as the Internet.

In an embodiment, the method further comprises detecting a user in proximity to the air purification apparatus; and in response to detecting said proximity, capturing pollutant data in the first configuration, and communicating the captured pollutant data to a remote device for facilitating storage and evaluation of the captured pollutant data with the remote device, optionally wherein the captured pollutant data comprises captured pollen levels. This facilitates the generation of statistical information regarding pollutant levels of interest with the air purification apparatus, which may be communicated to a remote device, e.g. a smart phone, tablet computer, PC or the like, for processing on the remote device. In this manner, a person exposed to the pollutant of interest, e.g. an asthma sufferer exposed to pollen levels, may obtain information relevant to the management of a medical condition associated with that particular pollutant.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
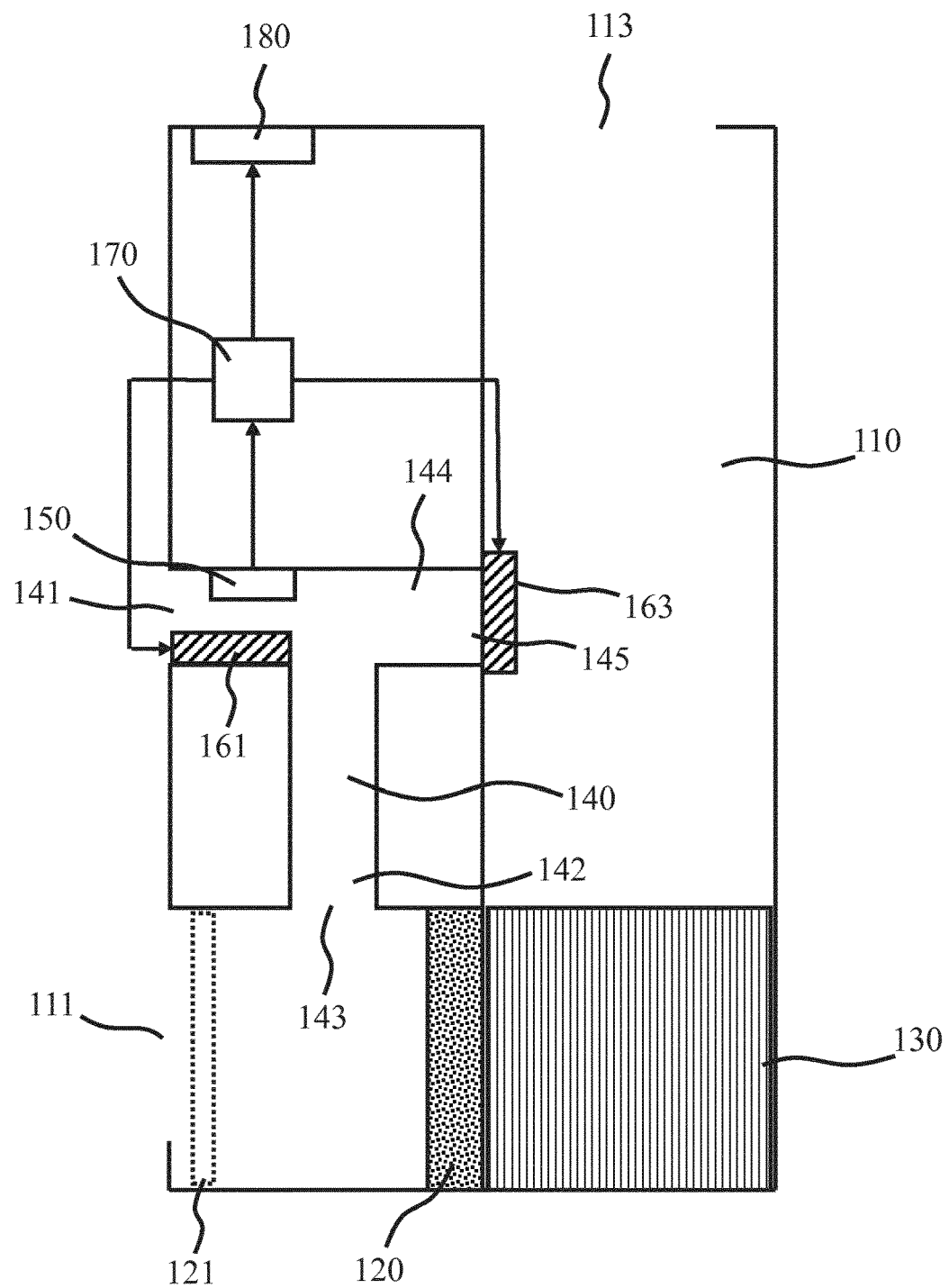
FIG. 1 schematically depicts an air purification apparatus according to an embodiment in a first configuration.

It should be understood that the Figures are merely schematic and are not drawn to scale. It should also be understood that the same reference numerals are used throughout the Figures to indicate the same or similar parts.

FIG. 1 schematically depicts an air purification apparatus 100 according to an embodiment of the present invention. The air purification apparatus 100 comprises a major flow path 110 extending between an air inlet 111 and an air outlet 113. An air purification arrangement including one or more pollutant removal structures 120 is located in the major flow path 110 to remove targeted pollutants from the ambient air entering the air purification apparatus 100 through the air inlet 111 such that purified air is expelled from the air purification apparatus 100 through the air outlet 113. The one or more pollutant removal structures 120 may include one or more filters such as HEPA filters, carbon filters, catalytic converters, electrostatic precipitators, and so on, in order to remove pollutants such as particulate matter, pollen, odours, bacteria, formaldehyde and so on from the atmosphere in a space in which such an air purification apparatus 100 is placed.

The air purification path 110 further comprises an air displacement apparatus 130, such as a pump, fan, ionic wind generator or the like for sucking ambient air into the major flow path 110 through the air inlet 111 and expelling the purified air back into ambient through the air outlet 113. The air purification apparatus 100 may be any suitable type of air purification apparatus, e.g. may be a portable air purifier. The one or more pollutant removal structures 120 and the air displacement apparatus 130 may be located in any suitable location within the major flow path 110 in between the air inlet 111 and the air outlet 113. In an embodiment, the air displacement apparatus 130 is located in between the one or more pollutant removal structures 120 and the air outlet 113 although alternative embodiments, e.g. wherein the air displacement apparatus 130 is located in between the one or more pollutant removal structures 120 and the air inlet 111 may also be contemplated. The air purification apparatus 100 may further comprise a further pollutant removal structure 121, e.g. a pre-filter or the like, in the vicinity of the air inlet 111, e.g. mounted in or over the air inlet 111.

The air purification apparatus 100 further comprises a branched sensor channel 140 including a first branch 142 extending between an ambient air port 141 and a minor inlet 143 into the major flow channel 110 and a second branch 144 extending between the ambient air port 141 and a minor outlet 145 of the major flow channel 110. The first branch 142 and the second branch 144 have a shared branch section in which at least one pollutant sensor 150 is located. Such a pollutant sensor 150 is typically chosen to sense a pollutant for which the air purification apparatus 100 comprises a pollutant removal structure, such that the pollutant sensor 150 may sense the concentration of the pollutant in the ambient air prior to the air passing through the corresponding pollutant removal structure or in the air purified by the air purification apparatus 100, i.e. by the corresponding pollutant removal structure 120. For example, the pollutant sensor 150 may be at least one of a PM 2.5 sensor, a gas sensor, a pollen sensor, a microorganism sensor, a (bio) aerosol sensor and an odour sensor. Other suitable sensor types are well-known per se and may also be contemplated. In some embodiments, the sensor might be not a pollutant sensor but for instance a pressure sensor. In such embodiments, the fact that the pressure drop caused by a pollutant removal structure such as a particle filter changes with increased accumulation of pollutants may be used to derive information about the filter status.

In operation, the air displacement apparatus 130 creates a negative pressure relative to the ambient air pressure upstream from the displacement apparatus 130, such that an air gets sucked into the major flow path 110 through the air inlet 111 and the first branch 142 of the branched sensor channel 140, provided that the first branch 142 is fluidly connected to the major flow path 110 as will be explained in more detail below. At the same time, the air displacement apparatus 130 creates a positive pressure relative to the ambient air pressure downstream from the displacement apparatus 130, such that an air gets pushed out of the major flow path 110 through the air outlet 113 and the second branch 144 of the branched sensor channel 140, provided that the second branch 144 is fluidly connected to the major flow path 110 as will be explained in more detail below. The branched sensor channel 140 is typically dimensioned such that the majority of air the placed by the air displacement apparatus 130 enters the major flow path 110 through the air inlet 111 and access the major flow path 110 through the air outlet 113. As will be readily understood by the skilled person, the air flow rate through the major flow path 110 may be controlled by the air displacement apparatus 130. In this manner, the air flow rate over the at least one pollutant sensor 150 may also be regulated. By choosing appropriate dimensions for the branched sensor channel 140, i.e. diameters or cross-sections of the first and second branches 142, 144 and ports 141, 143, 145, the air flow rate over the at least one pollutant sensor 150 may be controlled. In an embodiment, the branched sensor channel 140 is dimensioned such that the air flow rate through the branched sensor channel 140 is (substantially) higher than the air flow rate through the air inlet 111 and air outlet 113.

Figure 2:
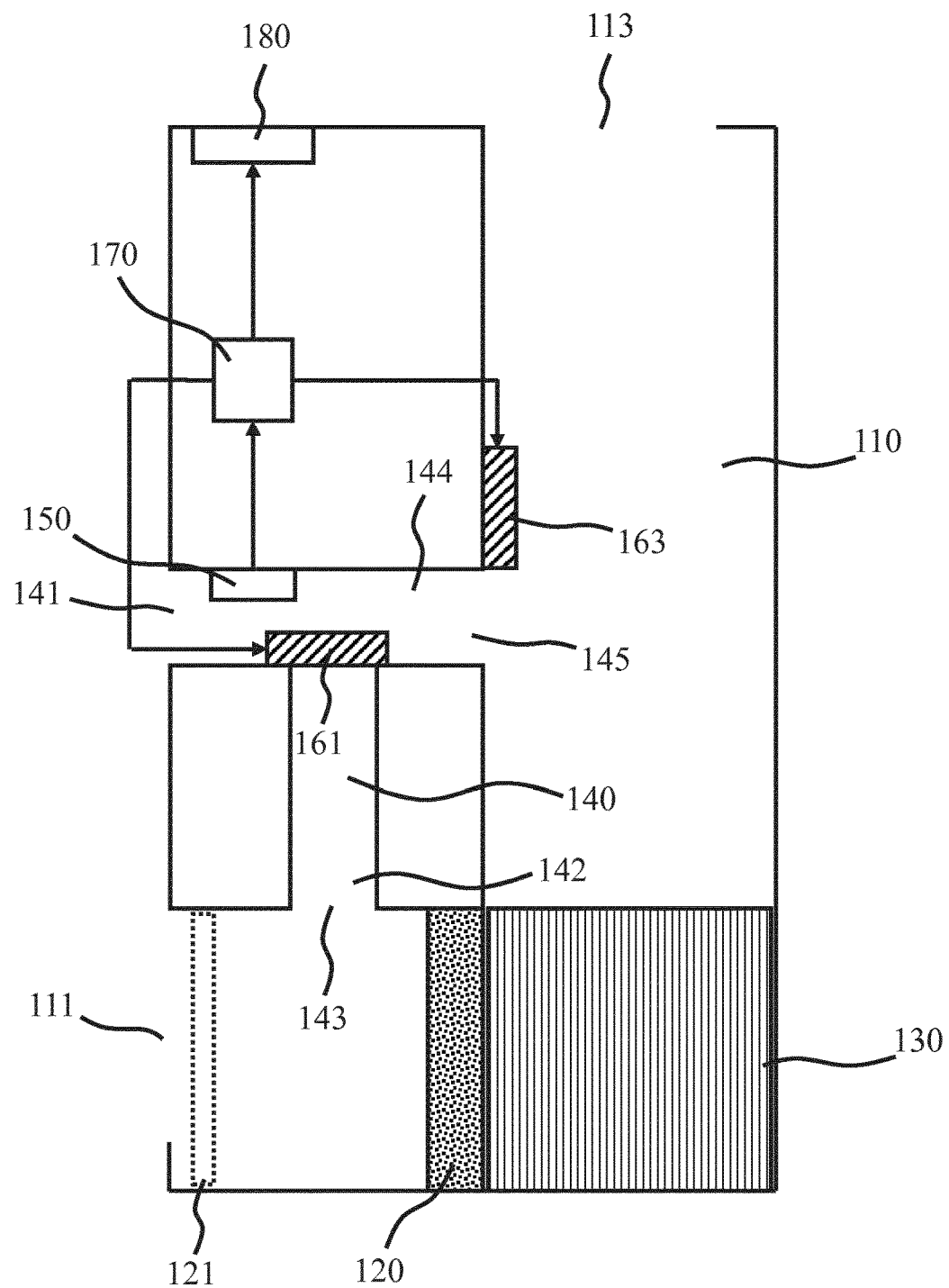
FIG. 2 schematically depicts an air purification apparatus according to an embodiment in a second configuration.

In another embodiment, the branched sensor channel 140 is dimensioned such that the air velocity through the branched sensor channel 140 is (substantially) higher than the air velocity through the air inlet 111 and air outlet 113. This may be understood as follows. During operation, the air displacement apparatus 130 creates an underpressure in the air flow channel 110 relative to ambient pressure upstream from the air displacement apparatus 130, i.e. in between the air inlet 111 and the air displacement apparatus 130. This is because air is more rapidly displaced by the air displacement apparatus 130 towards the air outlet 113 than it enters the air purification apparatus 100 through the air inlet 111. Consequently, this effect also creates an overpressure relative to ambient pressure in the air flow channel 110 downstream from the air displacement apparatus 130, i.e. in between the air displacement apparatus 130 and the air outlet 113. The air flow rates associated with this pressure difference can be controlled by dimensioning the channels through which the air flows as a result of these pressure gradients. Typically, by enlarging the diameter of such channels, the air flow rate is increased. Consequently, dimensioning of the first branch 142 and the second branch 144 can be used to adjust the air flow towards the sensor. In this way, high flow rates towards the sensor can be achieved without the need of an additional air displacement structure which is particularly important in situations where pollutant concentrations are low, such as in the case of pollen. The branched sensor channel 140 further comprises a valve arrangement under control of a controller 170 that is arranged to exclusively fluidly connect the first branch 142 between the ambient air port 141 and the minor inlet 143 in a first configuration as schematically depicted in FIG. 1 and to exclusively fluidly connect the second branch 144 between the ambient air port 141 and the minor outlet 145 in a second configuration as schematically depicted in FIG. 2. For example, the valve arrangement may include a first valve 161 arranged to fluidly connect or disconnect the first branch 142 from the major flow path 110 in the first configuration and second configuration respectively and a second valve 163 arranged to fluidly connect or disconnect the second branch 144 from the major flow path 110 in the second configuration and the first configuration respectively. Other arrangements, e.g. arrangements including additional valves, will be immediately apparent to the skilled person. The valve arrangement is typically arranged such that the shared branch section including the at least one pollutant sensor 150 forms part of the fluid path between the ambient air port 141 and the major flow path 110 in both the first configuration and the second configuration. This for example may be achieved by locating this shared branch section in between the ambient air port 141 and the valve arrangement. Any suitable types of valves may be used for the valve arrangement; for example, the first valve 161 and the second valve 163 may be solenoid valves although other types of valves are equally feasible.

Figure 3:
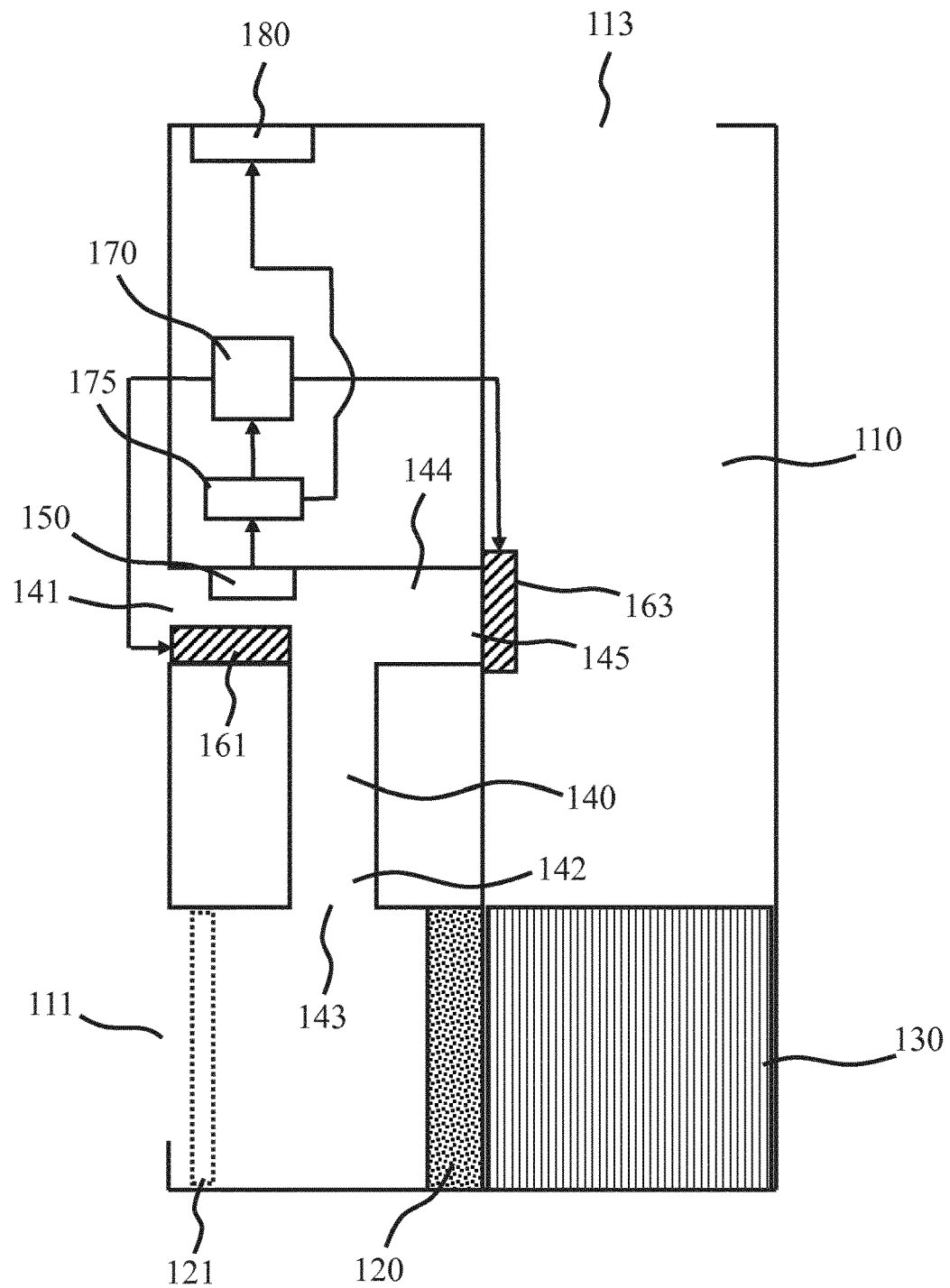
FIG. 3 schematically depicts an air purification apparatus according to another embodiment.

The controller 170 may be any suitable controller, e.g. a microcontroller unit (MCU), a generic processor operable to control the valve arrangement, and so on. In an embodiment, the controller 170 is adapted to periodically switch the valve arrangement between the first configuration and the second configuration. The controller 170 may further include processing functionality to derive a first pollutant concentration from sensor data provided by the at least one pollutant sensor with the valve arrangement in the first configuration and to derive a second pollutant concentration from sensor data provided by the at least one pollutant sensor with the valve arrangement in the second configuration. The processing functionality of the controller 170 may be further adapted to determine a pollutant removal efficiency of the pollutant removal structure from the derived first pollutant concentration and second pollutant concentration. Alternatively, as schematically depicted in FIG. 3, the air purification apparatus 100 may comprise a separate processor 175 responsive to the at least one pollutant sensor 150 as means of implementing this processing functionality. The processor 175 may be arranged to control the controller 170, e.g. to instruct the controller 170 to switch the valve arrangement between the first configuration and the second configuration as described above. The processor 175 may be implemented in any suitable manner, e.g. as an application specific integrated circuit (ASIC) or as general-purpose processor programmed to implement the desired functionality as described in the present application. Processor 175 may also have data storage means to store the sensor data and wireless communication means to send the sensor data to an external device such as an smart phone.

In an embodiment, the controller 170, e.g. its processing functionality, or the processor 175, may be adapted to control the air displacement apparatus 130 based on the determined pollutant removal efficiency of the pollutant removal structure 120 as derived from the sensor data provided by the at least one pollutant sensor in the first and second valve configurations respectively. For example, the controller 170 or the processor 175 may be adapted to increase the air displacement speed of the air displacement apparatus 130 in case of the pollutant removal efficiency of the pollutant removal structure 120 being below a defined efficiency threshold and/or may be adapted to decrease the air displacement speed of the air displacement apparatus 130 in case of the pollutant removal efficiency of the pollutant removal structure 120 being above a defined efficiency threshold.

In an embodiment, the controller 170, e.g. its processing functionality, or the processor 175 may be adapted to compare the determined pollutant removal efficiency against a defined efficiency threshold and to generate a pollutant removal structure end of life signal if the determined pollutant removal efficiency is below the defined efficiency threshold. In this manner, the efficiency of a particular pollutant removal structure 120 of the air purification arrangement may be determined from the difference between a first sensor reading of that particular pollutant in the first configuration of the valve arrangement, i.e. the pollutant concentration in the ambient air prior to air purification with the pollutant removal structure 120 and a second sensor reading of that particular pollutant in the second configuration of the valve arrangement, i.e. the pollutant concentration in the air purified with the pollutant removal structure 120.

For example, the controller 170 or the processor 175 may be adapted to determine the actual CADR of the particular pollutant removal structure from the following equation:

$$CADR = \frac{c_1 - c_2}{c_1} * \Phi \quad (1)$$

In Equation (1), CADR is the Clean Air Delivery Rate of the air purification apparatus 100, $C_1$ is the inlet air pollutant concentration of the air purification apparatus 100 as determined with the pollutant sensor 150 in the first configuration of the valve arrangement, $C_2$ is the outlet air pollutant concentration of the air purification apparatus 100 as determined with the pollutant sensor 150 with the valve arrangement in the second configuration and (I) is the air flow rate through the pollutant removal structure(s) 120 of the air purification apparatus 100. The air flow rate through the pollutant removal structure(s) 120 may be obtained in any suitable manner, e.g. by including a flow meter (not shown) in the major flow path 110 or by providing a look-up table or the like accessible by the controller 170 or the processor 175 from which the air flow rate may be obtained by identifying the appropriate air flow rate based on a user-specified flow rate setting of the air purification apparatus 100, e.g. by selecting a flow rate on a user interface of the air purification apparatus 100. Other suitable ways for the controller 170 to obtain the air flow rate (I) will be immediately apparent to the skilled person.

The controller 170 or the processor 175 may be adapted to compare the actual CADR as determined with Equation (1) against a benchmark CADR for the particular pollutant removal structure. Such a benchmark CADR for instance may be CADR specified by the manufacturer of the particular pollutant removal structure, e.g. a rated CADR obtained in a lab test following strict test procedures and safety guidelines, which may be programmed into the controller 170 or the processor 175 or into a memory accessible by the controller 170 or the processor 175 or may be an initial CADR determined with pollutant sensor 150, e.g. in a calibration mode after installation of the particular pollutant removal structure. Such a calibration mode may be initiated in any suitable manner, e.g. by a user or automatically following the detection of a replacement or servicing of the particular pollutant removal structure 120. This for instance may be detected by a sudden increase of the CADR as determined from first and second sensor readings performed with the pollutant sensor 150 with the valve arrangement in the first and second configuration respectively.

In an embodiment, the controller 170 or the processor 175 may comprise or may have access to a data storage device (not shown) in which the processor 120 may store CADRs determined with the fluid sensor device 10 as explained above in order to build a history of CADRs. Such a history for example may be used to predict an EOL of the particular pollutant removal structure, e.g. by extrapolating when the CADR of the particular pollutant removal structure is expected to reach a critical value based on the time elapsed between the determination of the initial value of the CADR in the history and the actual value of the CADR of the particular pollutant removal structure.

The controller 170 or the processor 175 may be adapted to generate a warning signal when the actual CADR approaches or reaches a critical value. For example, a particular pollutant removal structure may be considered to have reached its EOL if its actual CADR is 50% of its benchmark CADR. In other words, the controller 170 or the processor 175 may be adapted to generate a warning signal if a deviation of the CADR of the particular pollutant removal structure from its benchmark CADR exceeds a defined threshold, e.g. is at least 50% less than the benchmark CADR. Other defined threshold values are of course equally feasible. The warning signal may be produced on a sensory output device 180 of the air purification device 100 to alert a user that the monitored particular pollutant removal structure needs servicing and replacing. In this manner, impaired air purification with the air purification device 100 due to the particular pollutant removal structure exhibiting diminished CADR characteristics can be reduced or avoided altogether.

In an embodiment, the controller 170 or the processor 175 may generate a first warning signal indicative of the particular pollutant removal structure approaching a critical CADR and a second warning signal indicative of the particular pollutant removal structure reaching the critical CADR, i.e. an EOL-indicating CADR, such that the user may timely order a replacement particular pollutant removal structure (or a servicing of the monitored particular pollutant removal structure) in response to the first warning signal and may replace the old particular pollutant removal structure with the replacement particular pollutant removal structure (or have the monitored particular pollutant removal structure serviced) in response to the second warning signal.

The sensory output device 180 may be any device capable of producing an output that can be detected by one of the human senses. For example, the sensory output device 180 may be adapted to produce a visible or audible output in response to a warning signal generated with the controller 170 or the processor 175. For example, the sensory output device 130 may comprise a display and/or one or more LEDs adapted to provide a visible output and/or may comprise a loudspeaker or the like to produce an audible output in response to such a warning signal. Other suitable embodiments of such a sensory output device 180 will be immediately apparent to the skilled person.

Figure 4:
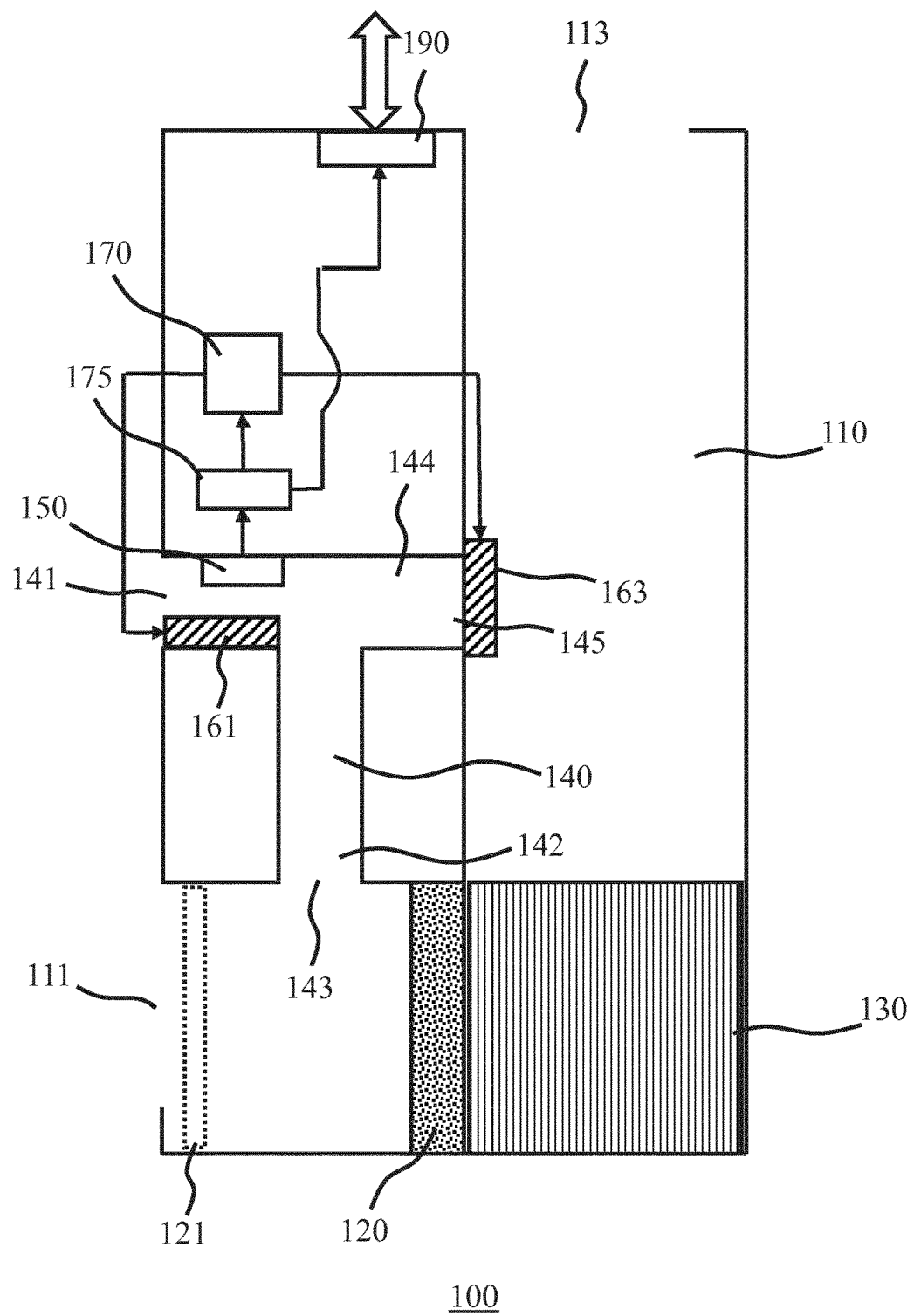
FIG. 4 schematically depicts an air purification apparatus according to yet another embodiment.

FIG. 4 schematically depicts an alternative embodiment of an air purification apparatus 100 in which the air purification apparatus 100 is adapted to communicate with a remote computing device. In this embodiment, the air purification apparatus 100 comprises a wireless communication module 190. The wireless communication module 190 is adapted to wirelessly communicate the respective sensor readings generated with the at least one pollutant sensor 150 in the first and second configurations of the valve arrangement to the remote computing device. In an embodiment, the remote computing device 200 may comprise a further processor and a further sensory output device, with the further processor receiving the wirelessly communicated sensor readings from the at least one pollutant sensor 150 through a further wireless communication module of the remote computing device. The further wireless communication module may be communicatively coupled to the wireless communication module 190 of the air purification apparatus 100.

In this embodiment, a user of the air purification apparatus 100 being in possession of the remote computing device may remotely monitor the CADR of the respective pollutant removal structures 120 of the air purification apparatus 100, which has the advantage that the user can be remotely alerted of the impending EOL of such a pollutant removal structure, such that the user can take immediate action to avoid sub-standard performance of the air purification apparatus 100 rather than having to be in the direct vicinity of the air purification apparatus 100 in order to notice such an alert.

The remote computing device may be a portable device such as a tablet computer, a mobile communications device such as a smart phone, a laptop computer or a stationary device such as a desktop computer. Other suitable embodiments of such a remote computing device will be immediately apparent to the skilled person. The remote computing device and the air purification apparatus 100 may communicate with each other through their respective wireless modules using any suitable wireless communication protocol, e.g. Bluetooth, Wi-Fi, a mobile communication protocol such as 2G, 3G, 4G or 5G, a suitable near-field communication (NFC) protocol or a proprietary protocol. In case of such wireless communication, the respective devices may communicate directly with each other or may communicate with each other through an intermediary such as a wireless bridge, a router, a hub, and so on. Any suitable embodiment of wireless communication between such respective devices may be contemplated.

The processor 175 or the further processor may be further communicatively coupled to a data storage device (not shown), which may form part of the air purification apparatus 100 or of the remote computing device. Such a data storage device may be any suitable device for storing digital data, e.g. a random access memory, a cache memory, a Flash memory, a solid state storage device, a magnetic storage device such as hard disk, an optical storage device and so on. Alternatively, the data storage device may be separate from the air purification apparatus 100 or the remote computing device, e.g. a network storage device or a cloud storage device accessible to the processor 120 over a network such as a LAN or the Internet.

The processor 175 or the further processor may be adapted to store historical CADRs in the data storage device. The data storage device may further comprise computer readable program instructions that, when executed by the processor 175 or the further processor, causes the processor 175 or the further processor to calculate the actual CADR from the sensor readings received from the air purification apparatus 100 to calculate (estimate) the EOL of the monitored pollutant removal structure from the actual and a benchmark CADR as explained above. It is noted for the avoidance of doubt that where reference is made to functionality implemented by the processor 175, this may equally be implemented by the processing functionality of the controller 170 as previously explained.

In an embodiment, the processor 175 (or the controller 170) may exploit the EOL estimation to automatically place an order for a new pollutant removal structure, e.g. filter or the like, or to order the servicing of an existing pollutant removal structure, e.g. a catalytic converter or electrostatic precipitator, via the Internet once the processor 175 determines that the predicted EOL reaches a defined threshold, e.g 2 weeks. To this end, the air purification apparatus 100 may be configured with details about the particular air purification apparatus 100 and the relevant pollutant removal structure(s) 120, such that the processor 175 (or the controller 170) can autonomously action servicing or replacement ordering of the relevant pollutant removal structure 120. For example, such details may be provided by a user during an initial system set-up, where a user registers these details via an app or the like. Alternatively, the remote computing device and the air purification apparatus 100 may be adapted to communicate with each other, e.g. over a wireless link, with the air purification apparatus 100 providing the necessary details to the remote computing device over the wireless link. In yet another embodiment, the remote computing device may be configured to implement the autonomous ordering of the pollutant removal structure replacement or servicing.

Figure 5:
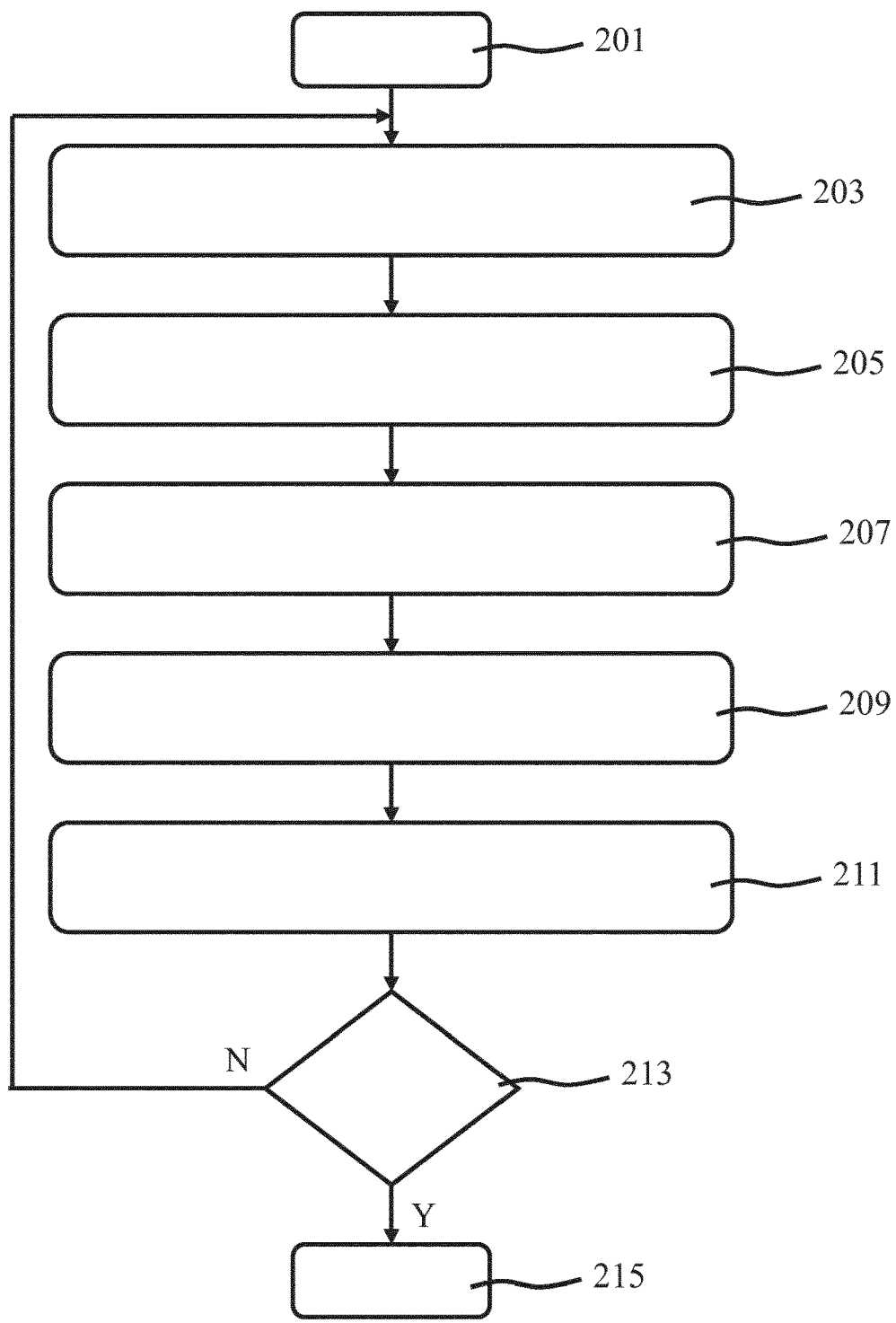
FIG. 5 is a flowchart of a method of operating an air purification apparatus according to an embodiment.

FIG. 5 is a flowchart of an example embodiment of a method 200 of operating the air purification apparatus 100 of the present invention. The method 200 starts in 201 for example by switching on the air purification apparatus 100 before proceeding to 203 in which the valve arrangement including the first valve 161 and the second valve 163 is switched to the first configuration in which the ambient air port 141 is fluidly connected to the inlet 143 into the main flow channel 110 such that the at least one pollutant sensor 150 is exposed to a fluid stream passing from the ambient air port 141 to the inlet 143 into the main flow channel 110 upon engagement of the air displacement apparatus 130. The valve arrangement may autonomously switch to the first configuration, e.g. the controller 170 may operate autonomously, or may switch to the first configuration in response to a configuration request signal provided by the processor 175. Upon exposure of the at least one pollutant sensor 150 to this fluid stream, the at least one pollutant sensor detects in 205 a first pollutant level in this fluid stream. It should be understood that the first pollutant level of several pollutants may be simultaneously detected by the at least one pollutant sensor 150 as previously explained.

Next, the valve arrangement in the branched sensor path 140 is switched to the second configuration in 207 such that the ambient air port 141 is fluidly connected to the outlet 143 of the main flow path 110 and the at least one pollutant sensor 150 is exposed to a fluid stream passing from the outlet 143 to the ambient air port 141 upon engagement of the air displacement apparatus 130 due to the positive pressure created by this apparatus relative to ambient pressure as previously explained. The valve arrangement may autonomously switch to the second configuration, e.g. the controller 170 may operate autonomously, or may switch to the second configuration in response to a configuration request signal provided by the processor 175. The valve arrangement may be arranged to switch to the second configuration after a certain time delay, e.g. a fraction of the second, a second or several seconds, and so on. This time delay is typically governed by the time it takes for the at least one pollutant sensor 150 to accurately detect the first pollutant level in 205.

Upon exposure of the at least one pollutant sensor 150 to the fluid stream in the second configuration, the at least one pollutant sensor 150 detects in 209 a second pollutant level in this fluid stream. It should be understood that the second pollutant level of several pollutants may be simultaneously detected by the at least one pollutant sensor 150 as previously explained. The fluid stream comprising the second pollutant level may be captured downstream from the air purification arrangement including the one or more pollutant removal structures 120 and thus provides an indication of the purification efficiency of this arrangement when compared to the first pollutant level of the fluid stream captured upstream from the air purification arrangement including the one or more pollutant removal structures 120.

In 211, an efficiency of the air purification arrangement including the one or more pollutant removal structures 120 is determined from the detected first pollutant level and the detected second pollutant level. This for instance may be achieved by calculation of the actual CADR of the monitored pollutant removal structure and comparing its actual CADR against a benchmark CADR for this structure as explained in more detail above. For example, the processor 175 (or the controller 170) may be programmed with the benchmark CADR or may obtain the benchmark CADR from an initial CADR determination with the at least one pollutant sensor 150 as explained above.

In an embodiment, the determined efficiency of the air purification arrangement including the one or more pollutant removal structures 120 may be used to control the air displacement speed generated with the air displacement apparatus 130, e.g. to achieve a target efficiency of the air purification apparatus 100. For example, in case the determined efficiency is below the target efficiency, the air displacement speed may be increased such that larger volumes of air are forced through the air purification apparatus 100 per time unit, or in case the determined efficiency is above the target efficiency, the air displacement speed may be decreased such that smaller volumes of air are forced through the air purification apparatus 100 per time unit.

In another embodiment, it may be determined in 213 if the monitored pollutant removal structure has reached or is approaching its EOL as previously explained. If this is the case, a warning signal may be generated to alert a user that the monitored pollutant removal structure has reached or is approaching its EOL before the method 200 terminates in 215. If on the other hand it is determined in 213 that the monitored pollutant removal structure has not yet reached or approached its EOL, i.e. is functioning satisfactorily, e.g. has an actual CADR well above 50% of its benchmark CADR, it may be checked if the method 200 is to continue. If this is the case, the method 200 may revert back to 203; otherwise, the method may terminate in 215.

Figure 6:
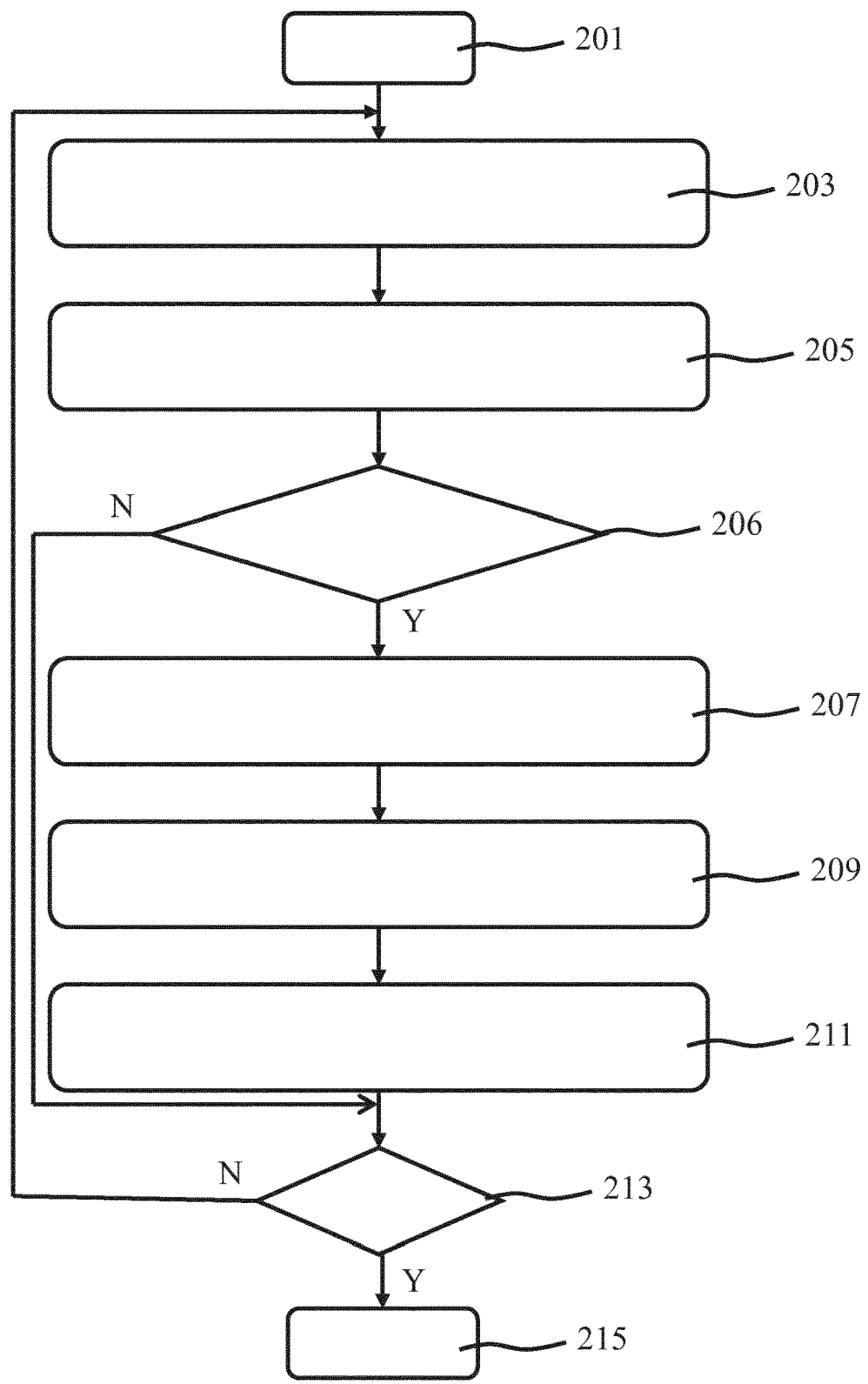
FIG. 6 is a flowchart of a method of operating an air purification apparatus according to another embodiment.

FIG. 6 is a flowchart of another example embodiment of a method 200 of operating the air purification apparatus 100 of the present invention. The embodiment depicted in FIG. 6 differs from the embodiment depicted in FIG. 5 in that after determining the first pollutant concentration in 205, it is checked in 206 if the valve arrangement is to be switched to the second configuration. If this is the case, the method 200 proceeds to 207 as previously explained. However, if this is not the case, it is checked in 213 if the valve arrangement should be kept in the first configuration, i.e. if the air purification apparatus should continue to measure the pollutant concentration in the inbound air with the at least one pollutant sensor 150, in which case the method 200 may revert back to 203, or if the method 200 should terminate in 215. In this manner, the air purification apparatus 100 may be configured to monitor pollutant levels, e.g. pollen levels, in the ambient air for a prolonged period of time, e.g. half an hour to an hour in order to gather pollutant statistics, e.g. pollen levels in the ambient air, before switching the valve arrangement to the second configuration in order to obtain a differential measurement as previously explained.

This for example is particularly advantageous in case of the at least one pollutant sensor 150 comprising a pollen sensor, where the gathering of such statistical data about pollen levels in the ambient air may assist in monitoring the exposure of a user, e.g. an asthma sufferer, to pollen levels during a monitored time period. In this embodiment, step 205 may further comprise transmitting the determined pollen levels to a remote device, e.g. over a wireless link or the like, for storing the monitored pollutant levels on the remote device, e.g. a smart phone or the like, such that a user of the remote device can be informed of his or her exposure to such pollen levels by analysis of the sensor data generated with the at least one pollutant sensor 150 over the prolonged period of time. It will be immediately understood that the generation of such statistical data with the at least one pollutant sensor 150 is not limited to pollen monitoring and may be applied to any pollutant of interest to a user.

In an embodiment, the air purification apparatus 100 may further be adapted to detect the presence of the user in the vicinity of the air purification apparatus 100, e.g. by a presence detection sensor or by establishing a wireless link or by establishing a signal strength of such a wireless link such as a Bluetooth link between the remote device and the wireless communication module of the air purification apparatus 100, by means of location services, and so on, with the air purification apparatus 100 being further configured to only engage this prolonged ambient pollutant monitoring mode as long as the presence of the user is detected.

The method 200 may also apply to measuring different pollutant levels with the air purification apparatus 100, e.g. in case of the air purification apparatus 100 comprising multiple pollutant sensors. In this embodiment, it may be decided in 213 after the measurement of a first pollutant with a first pollutant sensor 150, e.g. a differential measurement as explained before, if the method 200 should revert back to 203 to measure or monitor a second pollutant level with a further pollutant sensor 150. In such a scenario, the amount of time the air purification apparatus 100 remains in the first and/or second configuration during each of these pollutant measurement cycles may be individualized e.g. optimized as a function of the type of pollutant. For example, for pollutants having known higher requirements in terms of sampling time and/or air volumes to which the corresponding pollutant sensor 150 need to be exposed, e.g. because of low concentrations of such pollutants in the ambient air, the sample time of the pollutant with its pollutant sensor 150, e.g. in the first configuration, may be optimized.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An air purification apparatus comprising:
a flow channel extending between an inlet and an outlet;
a pollutant removal structure and an air displacement apparatus in the flow channel;
a branched sensor channel including:
a first branch extending between an ambient air port and a further outlet in the flow channel between the inlet and the air displacement apparatus; and
a second branch extending between the ambient air port and a further inlet in the flow channel between the air displacement apparatus and the outlet, the first branch and second branch sharing a branch section;
at least one pollutant sensor in the shared branch section;
a valve arrangements in the branched sensor channel adapted to exclusively disconnect the first branch from the flow channel in a first configuration and exclusively disconnect the second branch from the flow channel in a second configuration; and
a controller adapted to control the valve arrangement;
a processor communicatively coupled to the pollutant sensor, the processor being adapted to derive a pollutant concentration from sensor data provided by the pollutant sensor;
wherein:
the controller is adapted to:
periodically switch the valve arrangement between the first configuration and the second configuration;
derive a first pollutant concentration from sensor data provided by the pollutant sensor with the valve arrangement in the first configuration;
derive a second pollutant concentration from sensor data provided by the pollutant sensor with the valve arrangement in the second configuration; and
determine a pollutant removal efficiency of the pollutant removal structure from the derived first pollutant concentration and second pollutant concentration.

2. The air purification apparatus of claim 1, wherein the controller comprises the processor.

3. The air purification apparatus of claim 2, wherein the processor is further adapted to compare the determined pollutant removal efficiency against a defined efficiency threshold and to generate a pollutant removal structure end of life signal if the determined pollutant removal efficiency is below the defined efficiency threshold.

4. The air purification apparatus of claim 3, further comprising a sensory output device responsive to the pollutant removal structure end of life signal.

5. The air purification apparatus of claim 3, further comprising a data communication module-f configurable to connect to a remote pollutant removal structure service and to order a replacement or service of the pollutant removal structure with the remote pollutant removal structure service in response to the pollutant removal structure end of life signal.

6. The air purification apparatus of claim 1, wherein the processor is adapted to provide the air displacement apparatus with an air displacement apparatus control signal generated in response to the derived pollutant concentration.

7. The air purification apparatus of claim 1, wherein the at least one pollutant sensor comprises at least one of a pressure sensor, a pollen sensor, a particle sensor and an odour sensor.

8. The air purification apparatus of claim 1, wherein the valve arrangement comprises a first valve in the first branch between the shared branch section and the further inlet and a second valve in the second branch between the shared branch section and the further outlet.

9. The air purification apparatus of claim 1, wherein the air purification apparatus is operable to create an underpressure relative to ambient pressure in a section of the flow channel upstream from the air displacement apparatus and an overpressure relative to ambient pressure in a further section of the flow channel downstream from the air displacement apparatus, wherein the further inlet is in fluid communication with the section characterized by said underpressure and the further outlet is in fluid communication with the further section characterized by said overpressure during operation of the air purification apparatus.

* * * * *